Figure 4:
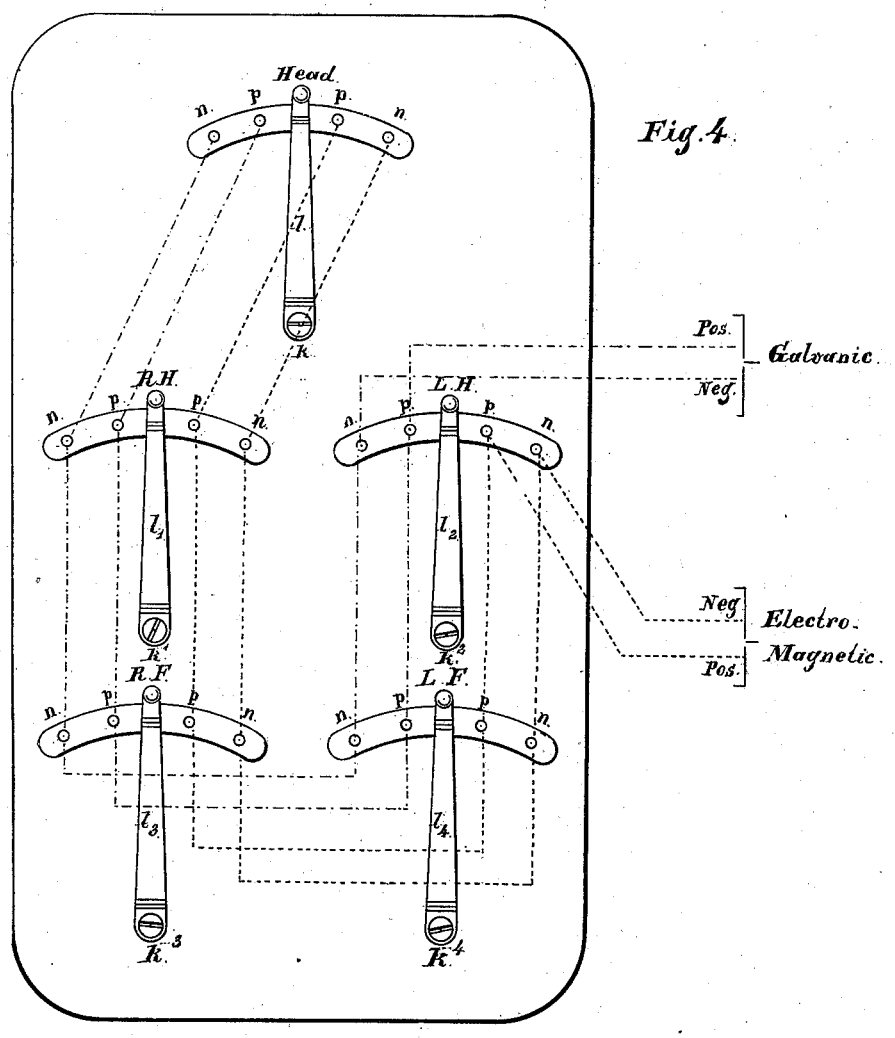

2 Sheets—Sheet 1.
S. C. PRATT.
Electro-Galvanic Chairs.
No. 199,663.   Patented Jan. 29, 1878.
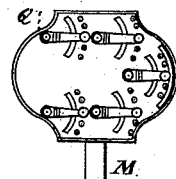
Fig. 1.
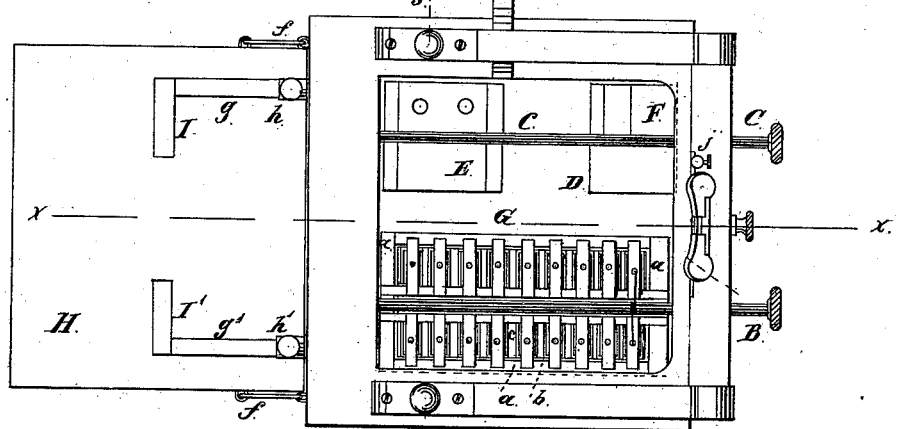
Fig. 2.
Fig. 3.
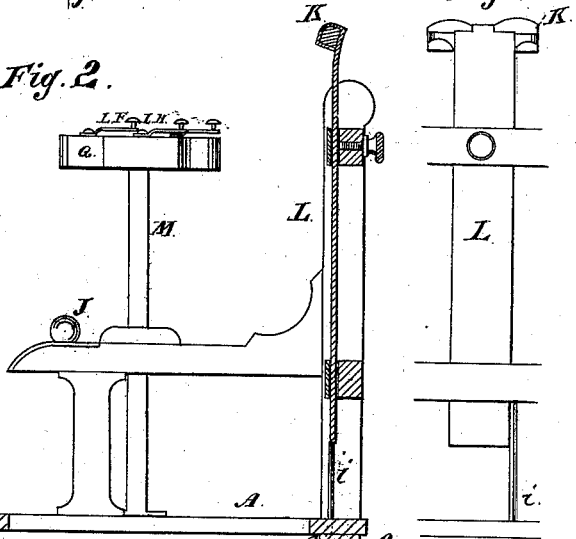
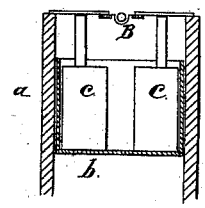
Fig. 5.
Witnesses:
E. A. West
O. W. Bond
Inventor:
S. Clesson Pratt.
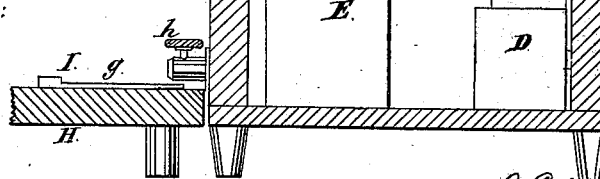

2 Sheets—Sheet 2.

S. C. PRATT.
Electro-Galvanic Chairs.

No. 199,663. Patented Jan. 29, 1878.

Witnesses:

Inventor:

UNITED STATES PATENT OFFICE.

S. CLESSON PRATT, OF CHICAGO, ILLINOIS.

IMPROVEMENT IN ELECTRO-GALVANIC CHAIRS.

Specification forming part of Letters Patent No. 199,663, dated January 29, 1878; application filed August 27, 1877.

*To all whom it may concern:*

Be it known that I, S. CLESSON PRATT, of Chicago, Cook county, State of Illinois, have invented new and useful Improvements in Electro-Medical Apparatus, of which the following is a full description, reference being had to the accompanying drawings, in which—

Figure 1 is a plan view, with the seat of the chair removed. Fig. 2 is a vertical section on line $x\,x$ of Fig. 1. Fig. 3 is a detail, being a rear view of the parts shown. Fig. 4 is an enlarged plan of the switch-table and switches. Fig. 5 is a transverse vertical section of the galvanic battery.

My invention consists in combining a galvanic and an electro-magnetic battery with a chair or other seat for the patient, so that either current separately or both currents together can be sent to the patient; in providing such seat and batteries with wires and switches, so arranged that a single set of switches controls both currents; in providing a switch-table at the side of such seat, so arranged that the operator can readily manipulate the switches, either when sitting or standing; in providing the seat with a head-rest connected with the batteries and with a connection for electrodes for local treatment.

In the drawings, A represents a chair, which, for convenience, should have a removable seat. The lower portion of the chair is incased on all sides, so as to exclude dust and conceal the contents, and is provided with a platform, on which the batteries are located. G is a galvanic battery, and E is an electro-magnetic battery.

$a$ is a case, which serves as a guide for a box, $b$, in which the cups $c$ for the solution are placed. B is a shaft, located in bearings in the walls of the chair. The box $b$, which holds the cups $c$, is connected with the shaft B by means of cords or straps, so that by rotating the shaft the box $b$ and cup $c$ can be raised up, bringing the cups up so that the plates will be in the solution, the plates being stationary. This relates to the battery G.

C is another shaft, by means of which the cup containing the solution for the other battery, E, can be in like manner raised.

$d$ is a ratchet-wheel, one on each shaft B C, and $e$ is a ratchet, one for each wheel $d$, for the purpose of holding the solution-cups in any desired position. The strength of the currents can be governed by raising or lowering the solution-cups.

D is a case, within which is located a helix for the battery E. F is a rheotome, through which the current from the galvanic battery passes, or may pass, if desired. H is a foot-board. As shown, it is held in place by means of hooks $f$; but it might be permanently connected to the chair.

I I' are metal plates upon the foot-board H. $g\,g'$ are metal connections between the plates I I' and the posts $h\,h'$, which are adapted to receive and hold wires connected with electrodes.

J J' are metal balls secured to the front ends of the arms of the chair, upon which the hands of the patient may be placed. K is a head-rest attached to a metal-plate, L, which can slide up and down in the back of the chair, and is held in place by means of a set-screw. $i$ is a metal rod or bar attached to the back of the chair, so as to be in contact with the slide L. The lower end of this rod $i$ is to be so located that wires can be connected therewith. $j$ is a binding-post, located on the back of the chair, and having a metal connection with the slide L.

M is a hollow standard, the lower portion of which is suitably secured to the side of the chair. It is curved up and carried a little way from the chair, so as to be out of the way of the patient. Upon the upper end of this standard is a hollow case, Q, the upper surface of which forms a switch-board.

$k\,k^1\,k^2\,k^3\,k^4$ are switch-posts, which are, respectively, connected with the head-rest, with the balls for the hands and the plates for the feet, as hereinafter more fully specified. $l\,l^1\,l^2\,l^3\,l^4$ are switches, which are, respectively, pivoted to such posts $k\,k^1\,k^2\,k^3\,k^4$. $p\,n$ are switch-posts—positive and negative.

It will be observed that there is a positive post, $p$, and a negative post, $n$, on each side of each of the switches. All of these posts $p\,n$ which are on the right-hand side of each switch (looking at the key-board from the front) are to be used to control and direct the electro-magnetic current, and all such posts $p\,n$ on the other side of the several switches are to be used to direct the galvanic current.

All of the posts $p$ which are on the right hand of the several switches are to be connected with the positive pole of the electromagnetic battery and with each other by a single wire, and all of the posts $n$ on the same side of such switches are to be connected with the negative pole of the electro-magnetic battery and with each other by means of another wire. All of the posts $p$ which are on the left hand of the several switches are to be connected with the positive pole of the galvanic battery and with each other by means of a single wire, and all of the posts $n$ on the left of the switches are to be connected with the negative pole of the galvanic battery and with each other by another wire. These connections are indicated by dotted lines in Fig. 4. The wires are to run from the batteries through the arm M into Q. The posts $p$ $n$ are to be so located that their respective switches can be made to touch them.

The head-rest is to be connected with the switch or key $l$ by means of a wire running from the rod $i$ to the post $k$. The ball J for the right hand is to be connected with the post $k^1$. The ball J' for the left hand is to be connected with the post $k^2$. The plate I for the right foot is to be connected with the post $k^3$. The plate I' for the left foot is to be connected with the post $k^4$. All of these connections are to be made by means of suitable wires, which can pass up through the standard M into the case Q.

I have not indicated all of the connecting-wires in the drawings, as their number might produce confusion; but any one familiar with the art can arrange them from the description.

The foot-plates can be connected with their proper switches by means of wires running from the binding-posts $h$ $h'$, which posts are connected with the foot-plates by means of the bars $g$ $g'$.

In use, a current from the galvanic battery can be run to the head of and through the patient, as follows: Place the head of the patient in the rest K, which should be provided with a moist sponge, the switch $l$ being in contact with the post $p$ on the left of $l$. Then, if the right hand be upon the knob or ball J and the key $l'$ be in contact with the post $n$ upon the left of $l'$, the circuit from the galvanic battery will be complete, the current passing from the positive pole to the head, thence through the body, passing out at the hand. The circuit can be completed by the use of either hand or either foot. So a current can be run from either battery to either hand or to either foot and through the patient, who completes the circuit by properly arranging the switches, which the operator can manipulate while either sitting or standing by the patient, a single set of switches controlling the currents from both batteries.

Both currents can be sent through different parts of the patient at the same time. For example, one current from the right hand to the right foot and the other current from the left hand to the left foot.

By the use of electrodes local treatment can be applied. For example, by the use of suitable electrodes, applied at $j$, (when a current is running to the head,) the eye, ear, spine, or other parts of the upper portion of the body can be treated. Local treatment can be applied to the lower limbs by means of electrodes connected at $h$ $h'$.

The direction of the currents can be changed by manipulating the switches.

The switches are marked as follows: "Head." R. H. for right hand; L. H. for left hand; R. F. for right foot; L. F. for left foot.

By arranging the switch-box Q at the side of the chair and upon the hollow standard M, all the wires running from the batteries and chair to the switches are concealed and protected. The switches, also, are so located that the operator can manipulate them either sitting or standing, and at the same time observe the patient, and, when desired, the patient, having been first sufficiently instructed, can manipulate the switches for himself.

When it is desired to use a current from the battery E alone, the solution-cups of the battery G are lowered by the shaft B, so as to be out of contact with the plates when that battery ceases to operate. When a current is desired from battery G alone, the cups in E are lowered in like manner till that battery ceases to act. Thus either or both may be thrown into or out of operation, or adjusted to have a strong or light action, as may be desired.

What I claim as new, and desire to secure by Letters Patent, is as follows:

1. A seat, A, in combination with a galvanic battery and an electro-magnetic battery and connecting-wires, substantially as and for the purposes described.

2. The combination of the batteries G and E with a seat, A, connecting-wires, and switches, so arranged that the current from either battery, or from both batteries, may be used and controlled by means of a single set of switches, substantially as specified.

3. The seat A, in combination with the support M and switch-box Q, located and operating substantially as set forth.

S. CLESSON PRATT.

Witnesses:
E. A. WEST,
O. W. BOND.